US000001841H

United States Statutory Invention Registration [19]

[11] Reg. Number: H1,841

Simmons

[45] Published: Mar. 7, 2000

[54] AIR COOLED ENGINE ENCLOSURE SYSTEM AND APPARATUS

[75] Inventor: Gerald P. Simmons, Morton, Ill.

[73] Assignee: Caterpillar Inc., Peoria, Ill.

[21] Appl. No.: 09/392,952

[22] Filed: Sep. 9, 1999

[51] Int. Cl.[7] ..... F02G 71/02

[52] U.S. Cl. ..... 60/597; 123/41.56

[56] References Cited

U.S. PATENT DOCUMENTS

| | | | |
|---|---|---|---|
| 3,827,523 | 8/1974 | Williams | 180/68 R |
| 3,866,580 | 2/1975 | Whitehurst et al. | 123/41.7 |
| 4,120,271 | 10/1978 | Edmaier | 123/41.49 |
| 4,241,702 | 12/1980 | Takeuchi et al. | 123/41.7 |
| 4,382,481 | 5/1983 | Moore | 180/54 A |
| 5,828,967 | 10/1998 | Ueda | 701/1 |

FOREIGN PATENT DOCUMENTS

0304080A2 8/1988 European Pat. Off. .

*Primary Examiner*—Harold J. Tudor
*Attorney, Agent, or Firm*—Kevin M. Kercher

[57] ABSTRACT

A system and apparatus for evacuating air from an at least partially enclosed space around an internal combustion engine including an exhaust pipe for the flow of combustion products to atmosphere. The present system and apparatus includes a shaft and structure for mounting the shaft to the exhaust pipe in the exhaust path, and an impeller mountable for rotation on the shaft, the impeller including a first rotor having at least one vane or blade positioned in the exhaust path and oriented so as to be rotatably driven by the flow of combustion products, and a second rotor connected in rotatably driven communication to the first rotor, the second rotor including at least one vane or blade positioned and oriented for propelling air within the enclosure for evacuating the air therefrom.

12 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AIR COOLED ENGINE ENCLOSURE SYSTEM AND APPARATUS

DESCRIPTION

1. Technical Field

This invention relates generally to engine cooling systems for work machines and vehicles, and more particularly, to a system and apparatus for evacuating engine heated air from an enclosed space around an internal combustion engine, utilizing waste energy from the exhaust system of the engine.

2. Background Art

Numerous systems and apparatus are well known for moving air in, and evacuating air from, enclosures and compartments containing internal combustion engines for cooling and other purposes. However, such known systems and apparatus typically require fans, power sources for the fans, and in some instances, heat exchangers such as radiators and the like, which occupy space, use engine power, and are costly items requiring periodic maintenance and replacement. Some of the known systems and apparatus additionally require special structure such as duct work, vents, intake and exhaust portals, and the like. Additionally, more powerful and large fans pose noise problems.

Accordingly, the present invention is directed to overcoming one or more of the problems as set forth above.

3. Disclosure of the Invention

In one aspect of the present invention, an air cooled enclosure system for an internal combustion engine including an exhaust pipe defining an exhaust path for the flow of combustion products to atmosphere, is disclosed. The present system includes an enclosure defining a space around at least a portion of the engine, and an impeller having a first rotor disposed in the exhaust path for rotation by the flow of combustion products, and a second rotor disposed in communication with the space defined by the enclosure and connected in rotatably driven communication with the first rotor for creating an air flow in the enclosure when driven by the first rotor for cooling the enclosure.

In another aspect of this invention, a method for evacuating air from an at least partially enclosed space around an internal combustion engine, the engine including an exhaust pipe defining an exhaust path for flow of combustion products from the engine to atmosphere is disclosed. The method comprising the steps of mounting a shaft and associated structure to the exhaust pipe in the exhaust path, and mounting an impeller on the shaft for rotation, the impeller including a first rotor having at least one blade positioned in the exhaust path and oriented so as to be rotatably driven by the flow of combustion products, and a second rotor connected in rotatably driven communication to the first rotor, the second rotor including at least one blade positioned and oriented for propelling air within the enclosure for evacuating the air therefrom.

BRIEF DESCRIPTION OF THE DRAWINGS

For a better understanding of the present invention, reference may be made to the accompanying drawings in which.

BEST MODE FOR CARRYING OUT THE INVENTION

Figure 1:
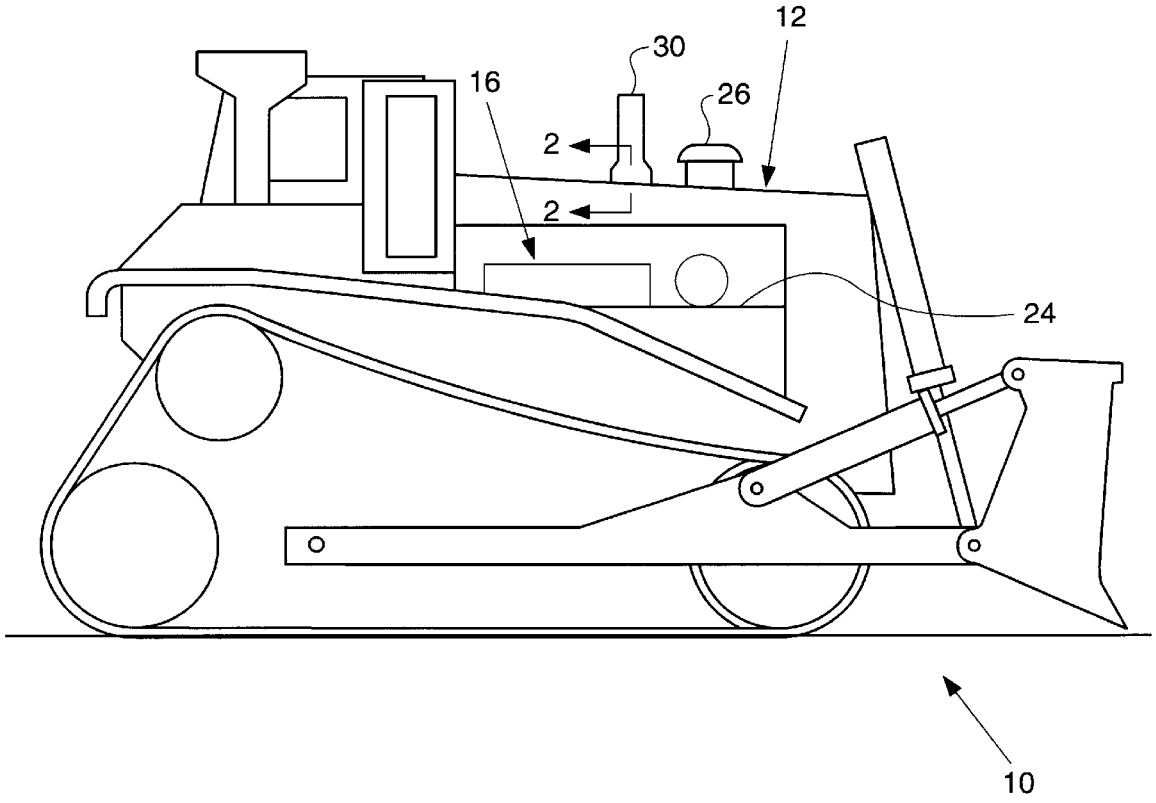
FIG. 1 is a side elevational view of a track-type work machine including an air cooled engine enclosure system and apparatus for evacuating air from an enclosed space around an internal combustion engine of the work machine according to the present invention.
Figure 2:
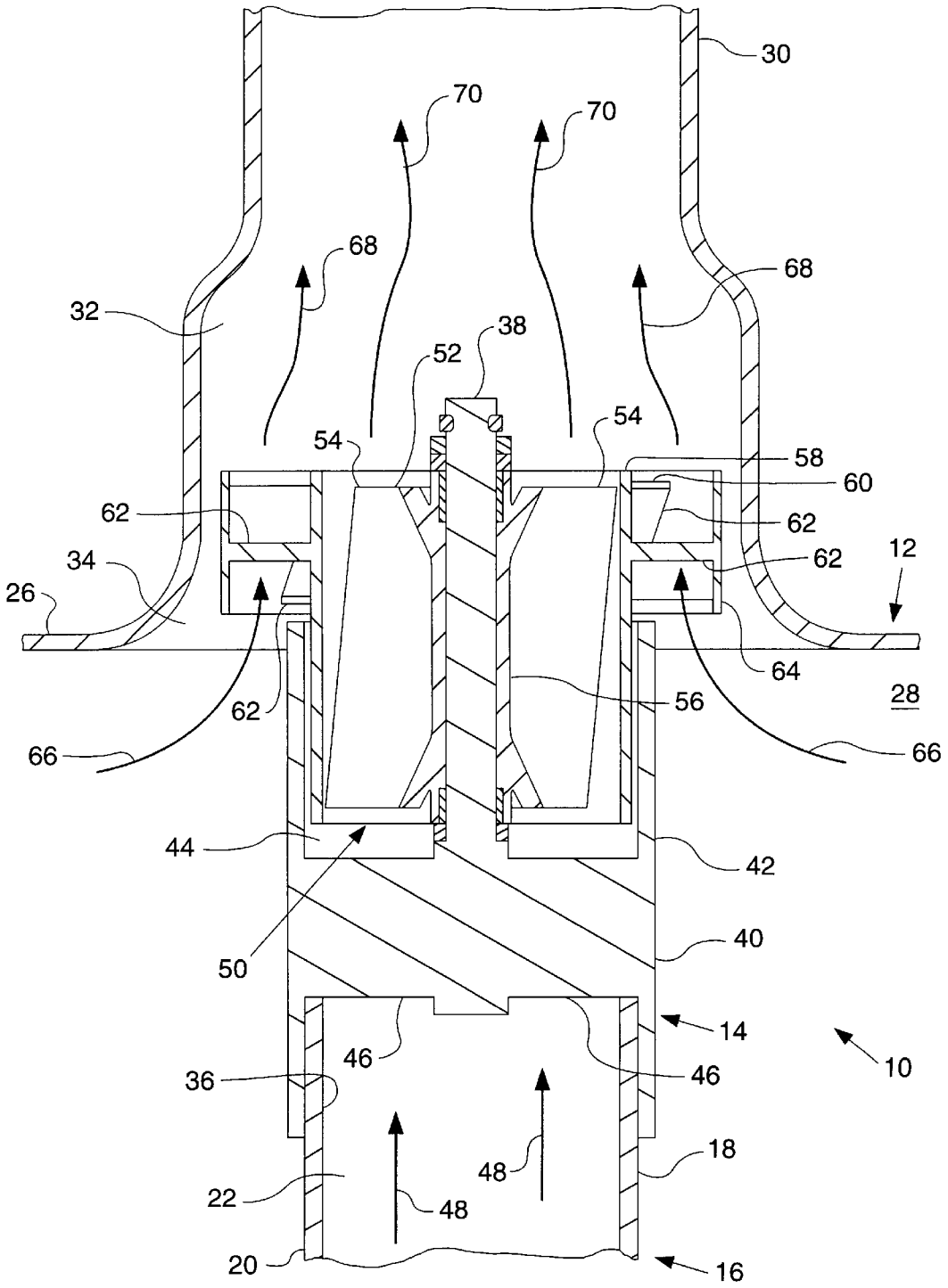
FIG. 2 is an enlarged fragmentary sectional view of the system and apparatus of the present invention taken along line 2—2 of FIG. 1.

With reference to FIGS. 1 and 2, a track-type work machine 10 is shown, however, any of a wide variety of machines may suffice. This track-type work machine 10 includes an air cooled engine enclosure system 12 including apparatus 14 for evacuating air from an at least partially enclosed space around an internal combustion engine 16 of machine 10, constructed and operable according to the teachings of the present invention. Internal combustion engine 16 includes an exhaust pipe 18 having a tubular side wall 20 defining a first exhaust path portion 22 for the flow of combustion products from engine 16 to atmosphere. Work machine 10 includes a frame 24 on which engine 16 is supportedly mounted, frame 24 also supporting an enclosure 26 defining a space 28 around engine 16, enclosure 26 in turn supporting an exhaust stack 30 of tubular construction which defines a second exhaust path portion 32 having a bell shaped inlet opening 34 positioned in fluid communication with an open outlet end 36 of exhaust pipe 18 for receiving combustion products therefrom.

Figure 3:
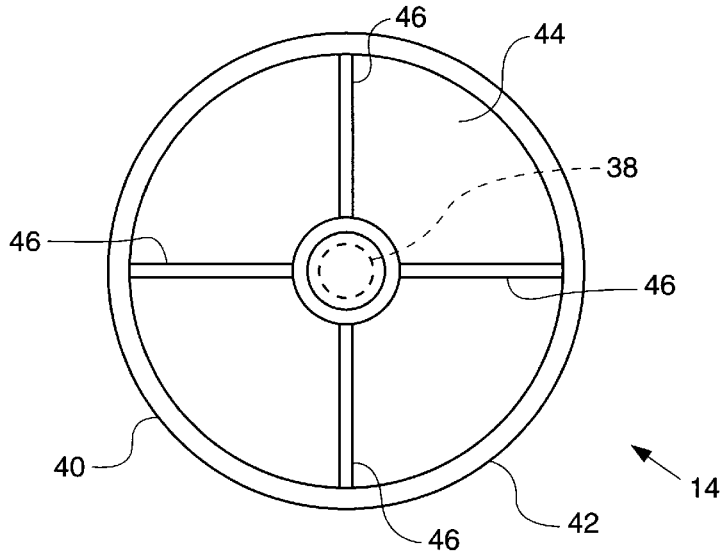
FIG. 3 is a top view of a shaft and structure for mounting the shaft of the apparatus of the present invention.

Referring also to FIG. 3, an apparatus 14 of system 12 includes a shaft 38 and structure 40 for mounting shaft 38 to an outlet end 36 of exhaust pipe 18 in first exhaust path portion 22. Structure 40 includes a tubular body portion 42 having a diametrical size marginally greater than that of exhaust pipe 18 so as to be mountable in telescoping relation thereto. Tubular body portion 42 defines an inner cavity 44 which functions as an extension of first exhaust path portion 22 for the flow of the combustion products therefrom to second exhaust path portion 32. A plurality of supports 46 support shaft 38 centrally within inner cavity 44 in substantially parallel relation to the flow of combustion products therethrough, as denoted by arrows 48.

Figure 4:
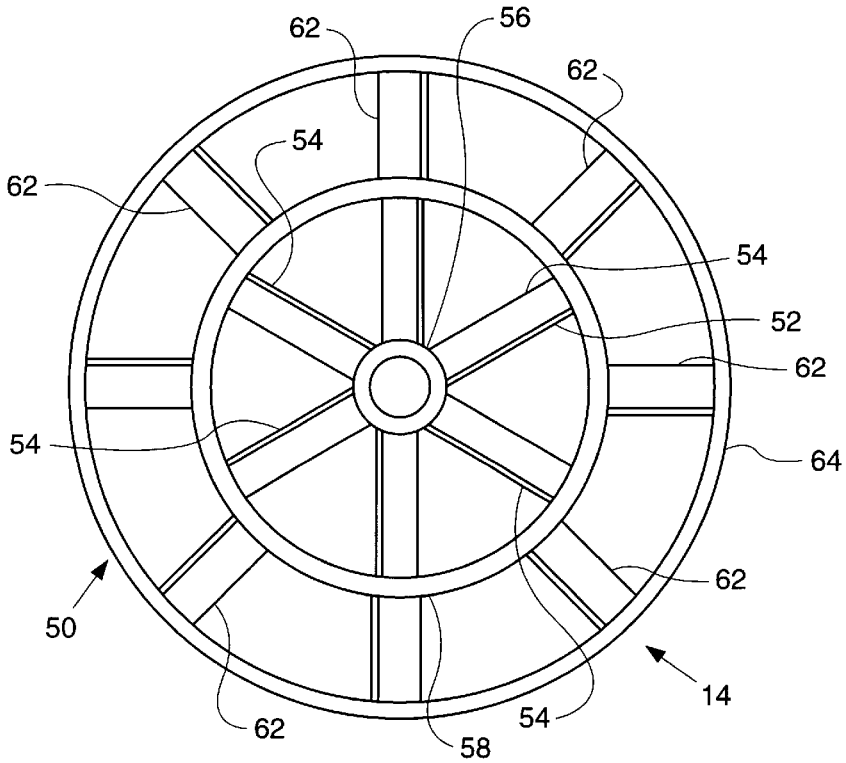
FIG. 4 is a top view of an impeller of the present invention.

Referring also to FIG. 4, apparatus 14 includes an impeller 50 mountable for rotation on shaft 38 and retained in position by a suitable conventional clip or retainer. Impeller 50 includes a first rotor 52 including a plurality of blades 54 emanating radially outwardly from a central bushing 56 for receiving shaft 38. Blades 54 are positioned and have a pitch similarly as shown, such that when impeller 50 is mounted on shaft 38, impeller 50 is rotatably driven by the flow of combustion products (arrows 48). Impeller 50 includes a first tubular duct 58 connected to the radial outer ends of blades 54, which duct 58 supports and connects a second rotor 60 in rotatably driven communication with first rotor 52. Second rotor 60 is located above and extends radially outwardly of tubular body portion 42 so as to be located in, or in sufficient proximity to, inlet opening 34 of exhaust stack 30 for causing an air flow in space 28 sufficient for propelling the air into inlet opening 34. Second rotor 60 includes a plurality of blades 62 extending radially outwardly from duct 58 terminating at a second tubular duct 64. Blades 62 are positioned and oriented so as to draw air from space 28, as denoted by arrows 66, through inlet opening 34 into exhaust stack 30, wherein the air will be mixed with the combustion products and be exhausted to atmosphere, as denoted generally by arrows 68 and 70.

An advantage of the present system is the use of energy derived from the exhaust flow of combustion products from engine 16 to rotatably drive impeller 50 for evacuating air from space 28, thus causing air flow through the space which contributes to the cooling of engine 16 and relieves some of the load on the primary cooling system (not shown). Another advantage is the elimination of motors, belts, and other drive means commonly utilized in known engine enclosure and compartment cooling systems, as well as inlet and outlet panels and the like typically associated therewith.

Still another advantage of the present system is the ability to install the apparatus of the system simply, at the time of manufacture, or later as a retrofit, merely by providing a shortened exhaust pipe or shortening an existing exhaust pipe, such that the apparatus of the present invention can be installed as shown hereinabove.

INDUSTRIAL APPLICABILITY

The present air cooled engine enclosure system and apparatus have utility for a wide range of work machine and vehicular applications, including, but not limited to, for tractors, bulldozers, and other agricultural and construction machines, mining machines, forestry machines, as well as on stationary engines such as engines used for operating pumps, generators and the like.

Other aspects, objects and advantages of the present invention can be obtained from a study of the drawings, the disclosure and the appended claims.

I claim:

1. An air cooled engine enclosure system comprising:

a frame;

an internal combustion engine supportedly mounted on said frame, said engine including an exhaust pipe defining an exhaust path for the flow of combustion products from the engine to atmosphere;

an enclosure defining a space around at least a portion of said engine; and an impeller having a first rotor disposed in the exhaust path for rotation by the flow of combustion products, and a second rotor disposed in communication with the space defined by the enclosure and connected in rotatably driven communication with the first rotor for creating an air flow in the enclosure when driven by the first rotor for cooling the enclosure.

2. The system of claim 1, wherein the second rotor is mounted to the first rotor for rotation therewith.

3. The system of claim 2, wherein the first rotor is disposed in an outlet end of the exhaust pipe.

4. The system of claim 3, wherein the outlet end of the exhaust pipe is disposed for directing the flow of combustion products into an inlet opening of an exhaust stack and the second rotor is disposed for directing the air flow into the inlet opening for mixing with the flow of combustion products therein.

5. An apparatus for evacuating air from an at least partially enclosed space around an internal combustion engine, the engine including an exhaust pipe defining an exhaust path for flow of combustion products from the engine to atmosphere, the apparatus comprising:

a shaft and structure for mounting the shaft to the exhaust pipe in the exhaust path; and an impeller mountable for rotation on the shaft, the impeller including a first rotor having at least one blade positioned in the exhaust path and oriented so as to be rotatably driven by the flow of combustion products, and a second rotor connected in rotatably driven communication to the first rotor, the second rotor including at least one blade positioned and oriented for propelling air within the enclosure for evacuating the air therefrom.

6. The apparatus of claim 5, wherein the second rotor is positioned for evacuating the air through an exhaust stack.

7. The apparatus of claim 5, wherein the structure for mounting the shaft to the exhaust pipe comprises a tubular member mountable to the exhaust pipe for receiving the flow of combustion products therethrough.

8. The apparatus of claim 5, wherein the first rotor and the second rotor of the impeller are concentric about the shaft.

9. A method for evacuating air from an at least partially enclosed space around an internal combustion engine, the engine including an exhaust pipe defining an exhaust path for flow of combustion products from the engine to atmosphere, the method comprising the steps of:

mounting a shaft and associated structure to the exhaust pipe in the exhaust path; and mounting an impeller on the shaft for rotation, the impeller including a first rotor having at least one blade positioned in the exhaust path and oriented so as to be rotatably driven by the flow of combustion products, and a second rotor connected in rotatably driven communication to the first rotor, the second rotor including at least one blade positioned and oriented for propelling air within the enclosure for evacuating the air therefrom.

10. The method of claim 9, further comprising the step of positioning the second rotor for evacuating the air through an exhaust stack.

11. The method of claim 9, wherein the step of mounting a shaft and associated structure to the exhaust pipe in the exhaust path further comprises a step of receiving the flow of combustion products through a tubular member mountable to the exhaust pipe.

12. The method of claim 9, wherein the first rotor and the second rotor of the impeller are concentric about the shaft.

* * * * *